United States Patent
Kaiser

(10) Patent No.: US 7,228,329 B2
(45) Date of Patent: Jun. 5, 2007

(54) METHODS AND SYSTEMS FOR PROVIDING GUIDANCE USING CASE-BASED REASONING

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 855 days.

(21) Appl. No.: 10/334,342

(22) Filed: Dec. 31, 2002

(65) Prior Publication Data

US 2004/0128388 A1 Jul. 1, 2004

(51) Int. Cl.
*G06F 15/13* (2006.01)

(52) U.S. Cl. .................... 709/203; 709/204; 715/705; 434/118

(58) Field of Classification Search ................ 709/203, 709/204; 715/705; 434/118
See application file for complete search history.

(56) References Cited

U.S. PATENT DOCUMENTS

| 5,325,298 | A | | 6/1994 | Gallant |
| 5,675,819 | A | | 10/1997 | Schuetze |
| 5,701,399 | A | | 12/1997 | Lee et al. |
| 5,918,010 | A | * | 6/1999 | Appleman et al. .......... 709/203 |
| 6,341,282 | B1 | | 1/2002 | Sharpe et al. |
| 6,442,590 | B1 | * | 8/2002 | Inala et al. .................. 709/204 |
| 6,539,419 | B2 | * | 3/2003 | Beck et al. .................. 709/204 |
| 6,690,390 | B1 | * | 2/2004 | Walters et al. .............. 715/705 |
| 2004/0086834 | A1 | * | 5/2004 | Harned et al. .............. 434/118 |

OTHER PUBLICATIONS

Lennon, M., et al., "An Evaluation of Some Conflation Algorithms for Information Retrieval," Journal of Information Science, Postgraduate School of Librarianship and Information Science, University of Sheffield, West Bank, Sheffield, United Kingdom, North Holland Publishing Company, Mar. 19, 1981, introductory page and pp. 117-183.

Russell, S.J., et al., "Artifical Intelligence: A Modern Approach," Prentice-Hall, Inc., Upper Saddle River, New Jersey, 1995, Chapter 4, 2 introductory pages and pp. 111-115, no date.

* cited by examiner

*Primary Examiner*—Jinsong Hu
(74) *Attorney, Agent, or Firm*—Mintz, Levin, Cohn, Ferris, Glovsky & Popeo, P.C.

(57) ABSTRACT

Systems and methods of the instant invention may utilize case-based reasoning to provide guidance. Guidance may be provided to a current user of an application in a particular situation based on actions performed by previous users in compatible situations. A repository of sessions reflecting actions performed by previous users may be maintained. In response to a request for guidance, actions performed by the current user prior to requesting guidance may be used to retrieve, from the repository, one or more sessions containing related actions. The retrieved sessions may be evaluated and used to provide guidance to the current user.

34 Claims, 11 Drawing Sheets

ACQUISITION MODULE OPERATION

EVALUATOR OPERATION dpmCLIENT (SAP client)
CLNTID (identifier of the calling application)
LEXCLNTDEP (parameter whether (SAP)-client dependence is important)
CB-1 (name of first callback module)
CB-2 (name of second callback module)
CB-3 (name of third callback module)
SdpmCORPAR
MANDT ((SAP)-client identifier if dependence is important)
CLNTID ((application)-identifier)
CORPUSID (archive identifier)
LANGU (language identifier)
REFCORPID *identifier of an archive from which to inherit data)
LEARNP (parameter specifying learn curve)
LEARNMODE *mode for learning, either training or feedback)
SdpmSESSID (session identifier)
MANDT (SAP client)
CLNTID (application id)
CORPUSID (corpus id)
LANGU
SESSIONID
SdpmLEXICO
MANDT
CLNTID
CORPUSID
LANGU
DESCRIPT (short description of the archive)
CRUSER (name of the user creating a session)
CRDATE (creation time of the session)
CRTIME (time of creation)
NUMSESS (number of onserved sessions)
SdpmACTIONS
MANDT
CLNTID
CORPUSID
LANGU
ACTENTRY (name of an action or symbol)
TOTFREQ ( number of sessions in which action is observed)
SdpmOCCUR
MANDT
CLNTID
CORPUSID
LANGU
ACTENTRY
SESSIONID
POSITION (position at which the action occurred in session)
SdpmATRDEF
MANDT
CLNTID
CORFUSID
LANGU
SESSIONID
POSITION
ATTRNAME (name of an attribute)
ATTRVALUE (value of an attribute)

FIGURE 10

Callbacks necessary to interface with the application
- one callback for application to pass data (session tables)
  gets MANDT(optional), CLNTID,
CORPUSID,
REFCORPID (optional),
LANGU (optional)
and a deep nested table with the following line structure 1 x,
and a table with n X attrname, n X attrvalue

METHODS AND SYSTEMS FOR PROVIDING GUIDANCE USING CASE-BASED REASONING

BACKGROUND OF THE INVENTION

1. Field of the Invention

The present invention generally relates to data processing systems, and more particularly to systems and methods for generating guidance using aspects of case-based reasoning. In one example, a guidance-seeking user of an interactive system in a particular situation could request, and be provided with, a recommended course of action based on actions performed by previous users of the system in similar situations.

2. Description of the Related Art

Due to the increasing complexity of computer applications and environments, it is becoming increasingly difficult, despite user manuals and online aids, for users to successfully and efficiently achieve their desired goals. That is, users of a given application (e.g., an e-commerce website) often have difficulty determining which steps to take in order to achieve an anticipated outcome. In some cases, users may be completely lost, not knowing how or where to begin their pursuit. In certain situations, users may not be able to navigate through, or even appreciate, all of the possibilities and options that are available. Each of these predicaments may be especially acute for first time and/or inexperienced users.

Typical on-line guidance systems are often ineffective in providing effective guidance and may even exacerbate a user's dilemma. Often, a befuddled user's only option is to ask a more experienced user for guidance. The more experienced user may provide assistance based on his or her previous interactions with the environment. That is, the experienced user, or guide, may provide instructions as to which actions to perform in order to achieve a desired (or reasonable) result, remembering which action or series of actions he or she performed in the past. In this fashion, assistance is provided to the inexperienced user by exploiting the guide's previous experience. The inexperienced user, therefore, profits from the guide's prior experience.

Adapting solutions employed in prior situations to current problems is referred to as case-based reasoning ("CBR"). At its core, CBR is based on the notion that a current problem is often solved using a solution that was successfully used to solve a similar problem in the past. This basic principle can be especially effective when the previous solution is adapted to the circumstances of the current problem.

Case-based reasoning is a cyclical process, typically comprising four main steps: (1) retrieve; (2) reuse; (3) revise; and (4) retain. First, one or more prior cases that are similar to the current problem, or case, are retrieved. A solution suggested by the similar case(s) is then reused and tested for success. Unless the retrieved case is a perfect match to the current problem, the solution is then revised. This revision produces a new case that may be retained for subsequent retrieval. Case-based reasoning may be particularly accurate since all the elements included in the current case may be used to retrieve similar cases and suggested solutions are tested for success. In addition, as the number of cases increases and as solutions are revised, the quality of the suggested solutions improves.

Accordingly, given the ever-increasing complexity of computer systems and environments, it may be beneficial to utilize aspects of CBR as a basis for providing guidance to users of such systems.

SUMMARY

The instant invention is directed to methods and systems that may optionally obviate one or more of the above and/or other problems by providing guidance to individuals using interactive systems using aspects of case-based reasoning. Systems and methods consistent with principles of the instant invention may provide guidance to an individual in a particular situation based on actions previously performed by individuals in compatible situations. The instant invention may allow a user of an interactive system to successfully and efficiently achieve a desired goal by way of presenting one or more actions performed by previous users to achieve such goals.

Although the present invention, in its broadest sense, is not limited or inherently related to providing guidance to users of computer applications, such applications are used herein to convey principles of the invention.

One aspect of the present invention involves establishing and maintaining a repository of cases. A case, or session, may include a single action or a sequence of actions an individual performed or experienced while interacting with a given system. In one embodiment, a case may be reflective of an interactive computer session, revealing the actions that the user performed during the session. Thus, sessions serve as user interaction histories. For instance, in a web application, a session may include actions such as selected hyperlinks, entered search terms, and chosen menu items, that occur between user login and logout. In exemplary configurations, sessions may be stored and maintained in one or more databases.

Consistent with principles of the present invention, methods may be provided for obtaining sessions and adding the sessions to the repository. In one embodiment, an acquisition module may be employed to retrieve sessions from one or more applications and to store these sessions in the repository. One aspect of the invention may, therefore, involve ensuring that sessions are in a format which can be readily stored in the repository and accessed therefrom.

An aspect of the instant invention involves using the repository of sessions as a basis for providing information to guidance-seeking users. Accordingly, there may be methods provided for retrieving appropriate cases from the repository and using the cases to provide guidance to the user. In one embodiment, a retriever module may ascertain a guidance-seeking user's situation by retrieving a sequence of actions that this user has performed up until the point of requesting guidance (a partial session). The retriever may then use this partial session as a query and may retrieve one or more cases from the repository that contain the same or a sufficiently compatible sequence of actions as the partial session. Upon obtaining the compatible cases from the repository, methods may be provided for evaluating the cases and formulating guidance for the user.

In one embodiment, guidance may include suggestions or recommendations for subsequent actions. Guidance may be provided by way of presenting, from a session compatible with the query, one or more actions occurring after an action which corresponds to the last action performed (prior to requesting guidance) by the guidance-seeking user. Thus, a guidance-seeking user in a particular situation may be presented with a proposed coarse of action reflective of actions performed by previous users in the same situation. In one configuration, guidance may be presented to users via a user interface.

One aspect of the instant invention may involve providing guidance by exploiting a user's entire interaction history with a given application. That is, all or substantially all of the actions performed by the guidance-seeking user prior to requesting guidance may be used as a basis for generating guidance. In this fashion, the instant invention may transcend any limitations imposed by the Markov assumption, which purports that values in a given temporal state are only influenced by values of the immediately preceding state.

One aspect of the instant invention involves allowing the guidance to evolve over time. That is, there may be methods for adding new cases to the repository and eliminating old and/or unusable sessions. Upon receiving guidance, the user may follow the guidance exactly or may deviate from the provided guidance. In any case, upon successful completion, the user's session may be stored in the repository for use in future guidance.

Another aspect of the instant invention involves eliminating old and/or unusable sessions. Since user habits and/or solutions to problems may change over time, methods may be provided for eliminating old or unusable sessions from the repository so that these sessions are not considered for providing subsequent guidance. In addition, guidance may be evaluated or scored and eliminated when deemed ineffective.

The present invention may enable users of complex interactive systems to efficiently achieve their desired goals by way of presenting the actions performed to achieve such goals by previous users. The instant invention may, therefore, allow users to profit from the actions other, perhaps more knowledgeable, users previously performed in similar situations. Accordingly, the instant invention may enable users to effectively navigate through and optimally utilize interactive applications and environments.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

FIG. 10 depicts exemplary code in accordance with principles of the instant invention.

DETAILED DESCRIPTION

In the following detailed description, reference will be made to the accompanying drawings, in which like numerals represent like elements throughout the figures. The accompanying figures illustrate exemplary embodiments of the present invention, which are described in sufficient detail to enable those skilled in the art to practice the invention. It is to be understood that other implementations may be utilized and that structural and method changes may be made without departing from the scope of present invention. The following discussion is, therefore, not to be construed in a limiting sense.

Figure 1:
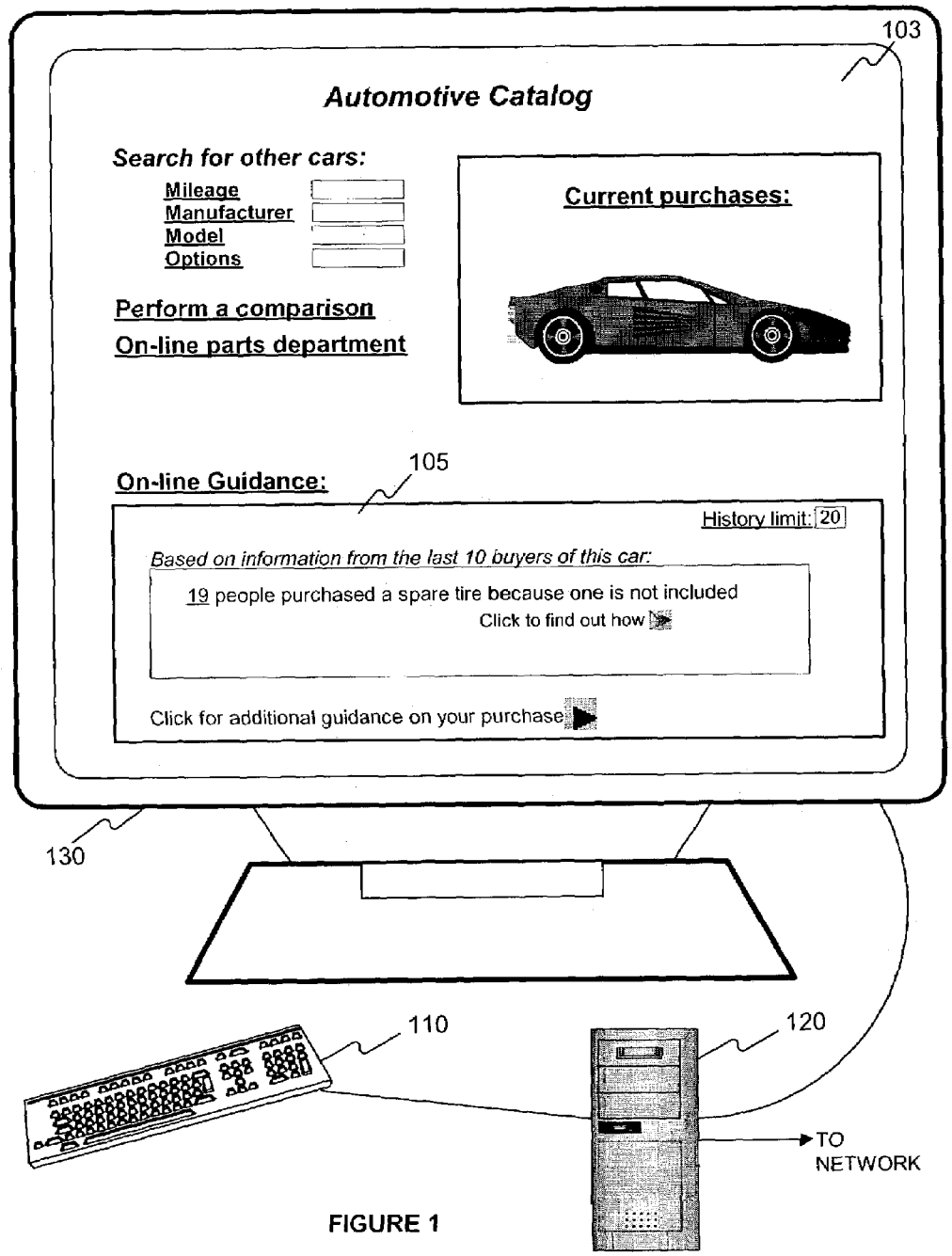
FIG. 1 is a screen shot depicting one exemplary implementation of the present invention.

Consistent with exemplary embodiments of the present invention, methods may be provided for providing guidance to a user of a particular application based on actions performed by previous users of that application. One exemplary implementation of the present invention is illustrated, by way of example, in the screen shot of FIG. 1. As illustrated in FIG. 1, a user interface may be provided through which a user of an application, in a particular situation, can request and receive guidance. In one embodiment, the application may be an e-commerce system, such as the automotive catalog (103) depicted in FIG. 1. The user may begin by browsing through the catalog mouse click by mouse click, or action by action. The user may then choose to purchase a particular vehicle, as shown. At this point, the user may be interested in additional accessories to purchase for the automobile. Essentially, the user may seek the type of advice typically provided by a live salesman. Consistent with principles of the instant invention, the user may be provided with such advise by evaluating one or more actions performed by previous purchasers of the automobile. For example, a spare tire may not be included with the particular model that the user has purchased and a number of previous purchasers bought this accessory separately. As illustrated, information reflecting the fact that others purchased a spare tire may be presented to the user. In addition, instructions as to how to proceed in order to purchase the spare tire may offered. Thus, the user can profit from the actions other, and perhaps more knowledgeable, users performed in the same or a compatible situation. Upon receiving the guidance, the user may choose to follow the recommended course of action or perform a deviating sequence of actions. In any case, upon completing the session (e.g. the automobile transaction), the session may be stored and used to provide guidance to future automobile purchasers. In one exemplary embodiment the completed session is stored only if successful. In another exemplary embodiment, only those sessions which are approved by the user are stored.

Figure 2:
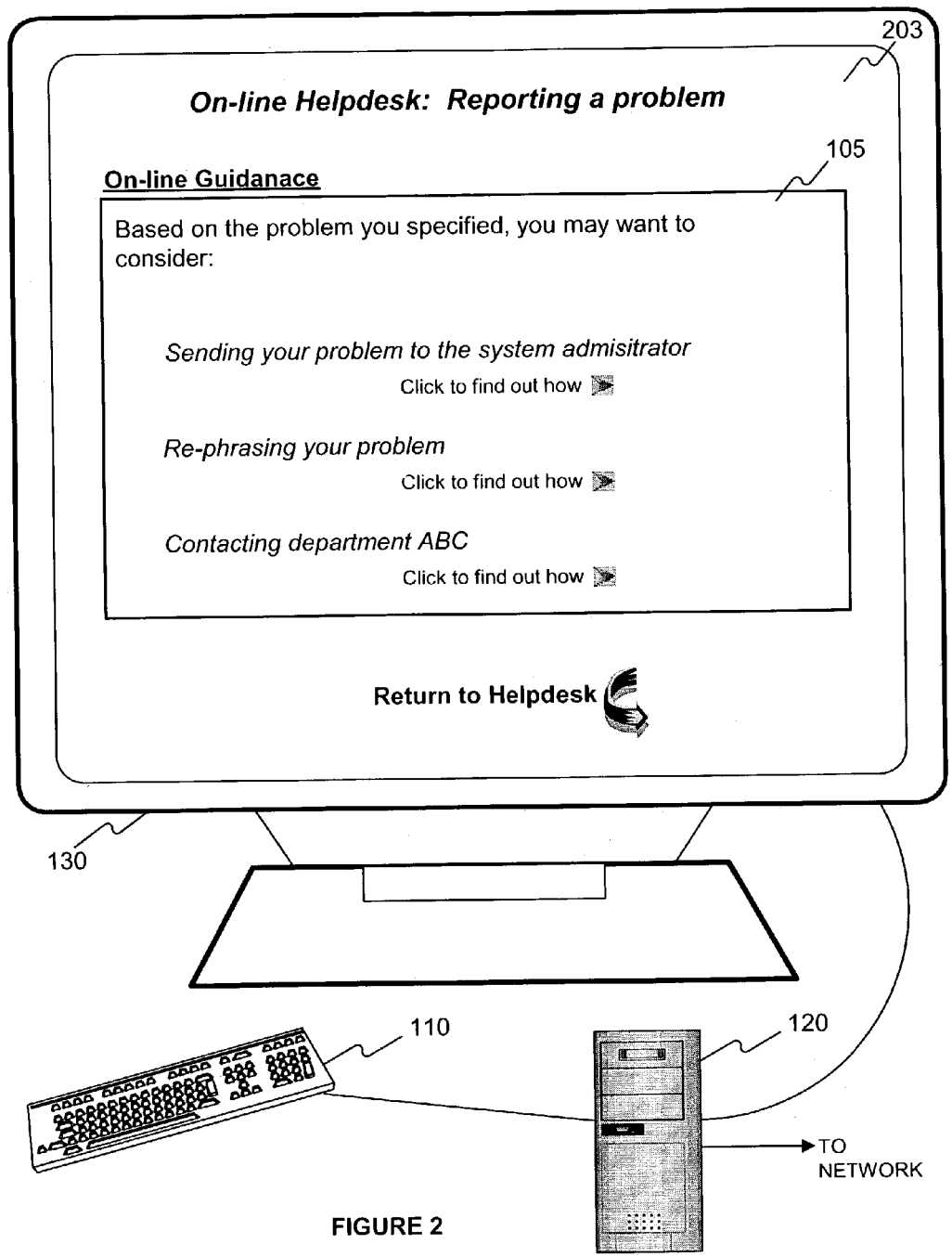
FIG. 2 is a screen shot depicting another exemplary implementation of the present invention.

Another exemplary implementation of the present invention is illustrated, by way of example, in the screen shot of FIG. 2. As illustrated in FIG. 2, the instant invention may provide guidance to a user in an interactive helpdesk environment (203). For example, as illustrated, the user may obtain information associated with where to send a problem and/or whom to contact. In addition, the user may receive suggestions for re-phrasing the problem in a more accurate or appropriate fashion. The guidance may be based on how other users of the system proceeded in the past. The guidance may also be based on all or substantially all of the actions performed by the user leading up to requesting guidance. In this fashion, the present invention may exploit an entire event sequence.

The foregoing discussion is intended to introduce and provide initial clarity for some of the aspects associated with the present invention by referring to the exemplary embodiments depicted in FIGS. 1 and 2. Further details of these embodiments as well as additional aspects and embodiments of the present invention will be described in the following discussion.

Figure 3:
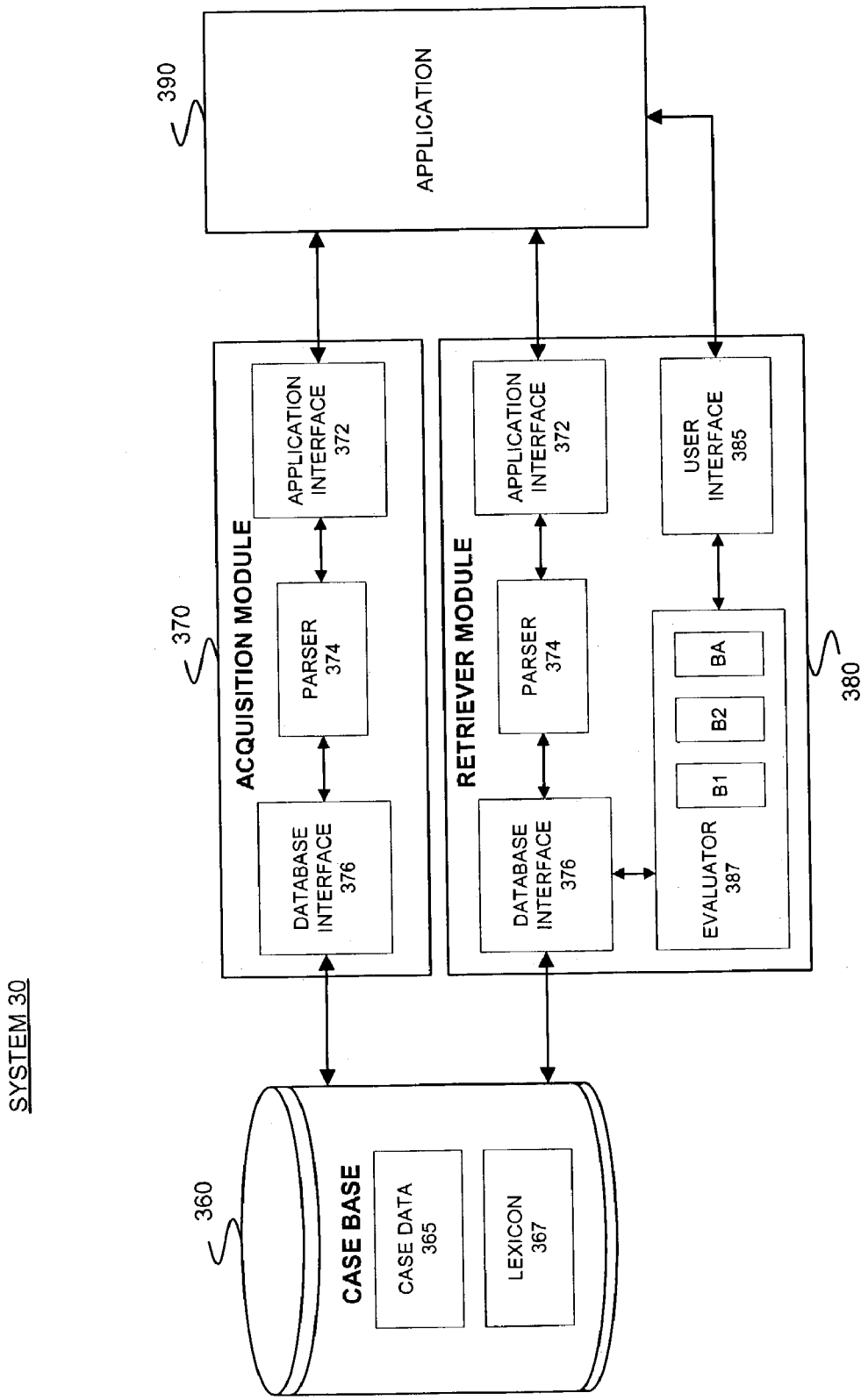
FIG. 3 is an exemplary block diagram of a system in accordance with principles of the present invention.
Figure 4:
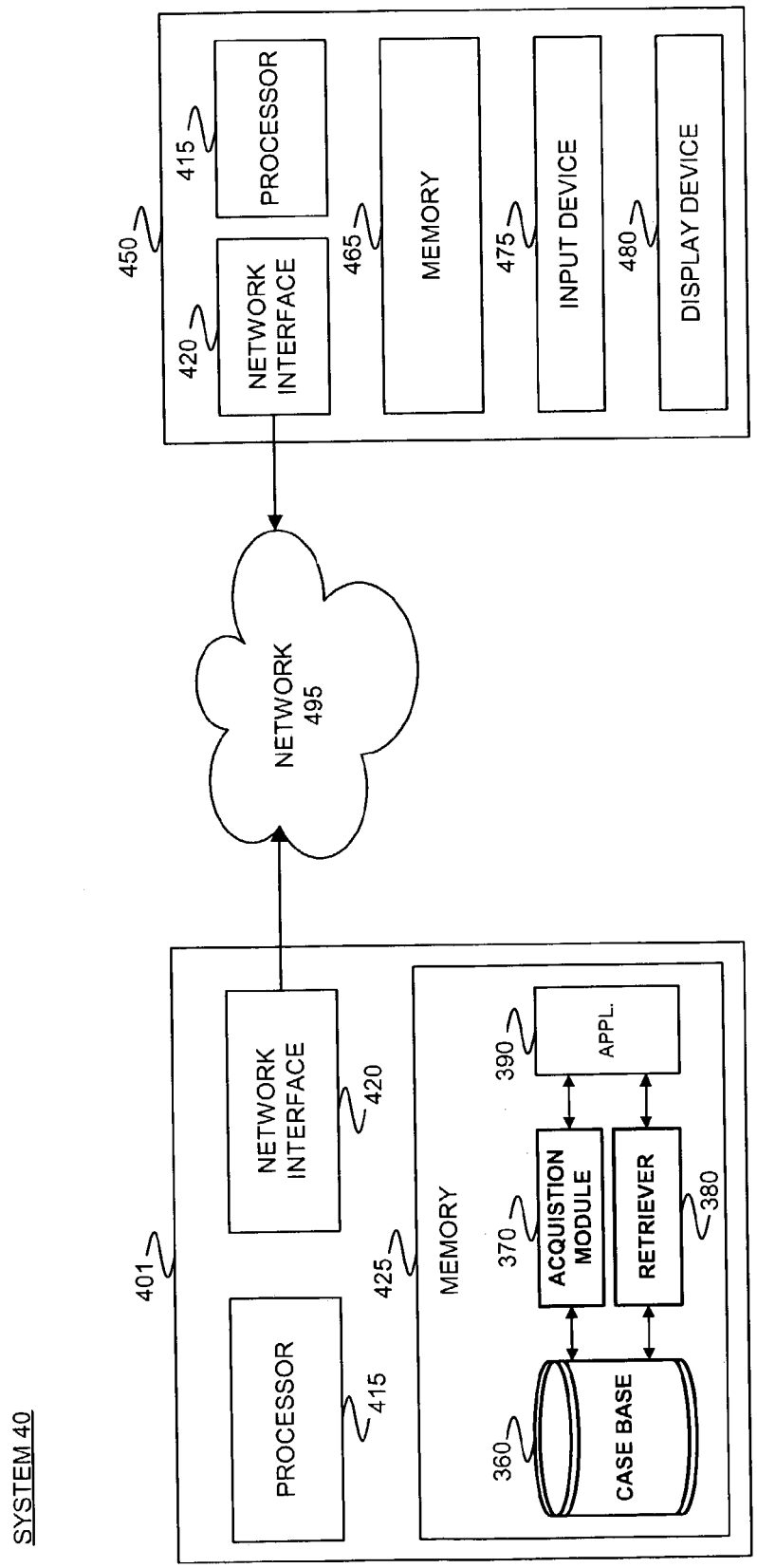
FIG. 4 is an exemplary configuration of the system depicted in FIG. 3.

Methods consistent with an exemplary embodiment of the present invention may be implemented via the combination of components included in system 30 of FIG. 3. As illustrated, system 30 may comprise a case base 360; an acquisition module 370; a retriever module 380; and an application 390. In one exemplary configuration, system 30 may be implemented in software and may reside on a server, as illustrated in FIG. 4. Further details of such an implementation as well as other alternative implementations will be discussed later in connection with FIG. 4.

Referring now to FIG. 3, application 390 may include any type of program or environment including, but not limited to, a word processor, a database program, a web browser, an e-commerce web site (103), a help-desk environment (203), a development tool, an intranet, extranet, and/or internet website, a multimedia tool, a communication program, and any combination thereof. For the sake of brevity, a single application (390) is illustrated in FIG. 3. However, it should be understood that any number of geographically-dispersed applications may be included in system 30.

Case base 360 may serve as a repository of cases or sessions. As used herein, the terms "case" and "session" are interchangeable and refer to one or more actions performed by a user interacting with application 390. The term "action" refers to any act, experience, behavior, conduct, input associated with a user. For example, in an e-commerce environment, actions may include selecting, via a mouse, a particular item in a menu or entering textual data in a field. A given session may comprise all, or a portion of, the actions a given user performed during his or her interaction with application 390. In one configuration, a session may span from the time a user logs on until that user logs off. In one implementation, case base 360 may be a relational database, distributed database, or object-oriented programming database. Case base 360 may, however, include any other mechanism, device, or structure for managing, accessing, and updating an aggregation of data.

It should be understood that a single action may not necessarily correlate to a single user act. For example, a series of mouse clicks could constitute a single action. In addition, it should be understood that a session may comprise any number of actions, and case base 360 may contain any number of sessions.

In exemplary embodiments, case base 360 may, for each session, store a description of the session. The description of a given session may include, but is not limited to: (1) a session identifier; (2) an application identifier; (3) a client identifier; (4) a corpus identifier; (5) a user identifier; and (6) a time/date stamp. As used herein, the term "identifier" refers to any symbol, value, tag, or alphanumeric designator for identifying and referencing its associated element (i.e.,
session, application, etc.) The time stamp may reflect the time and/or date that a particular session was created and/or entered in case base 360.

Case base 360 may also store, for each session, information associated with the session constituents. As explained above, a given session is constituted by a sequence of actions and attributes of actions. Accordingly, each action may be represented in case base 360 as a symbol. These action symbols may be any value, tag, or alphanumeric designator identifying or referencing a particular action. In exemplary embodiments, the action symbols contained in case base 360 constitute a system "vocabulary" and may be paired with one or more attributes or values. For example, "buy" is one example of an action. "Buy" may be paired with the attribute "car," forming the descriptive pair "buy car." This action and attribute may be further paired with a value or value range, such as "15,000 to 25,000." The action, attribute and value, taken together, would allow searching on the description "buy cars in the range $15,000 to $25,000." Any of the actions, attributes, and values may be stored in case base 360 alone or in associated sets or pairs.

In one configuration, information may be stored in case base 360 via one or more tables. For example, a session table may be included in case base 360 for maintaining session descriptions. Case base 360 may also include an occurrence table for maintaining each feature, along with each feature's respective session identifier and the position at which each feature occurs within their respective session. In one configuration, the vocabulary of actions, or "lexicon," may be maintained in a lookup table.

One exemplary configuration of case base 360, in which tables are employed, is illustrated by way of the exemplary code in FIG. 10. It should, however, be understood that the tables represented in FIG. 10 are exemplary only and may, in alternative implementations, contain additional elements, lack certain elements, or be configured in other arrangements. It should also be understood that other, tabular or non-tabular, data structures may be employed by case base 360 for storing information.

The above information described as being stored in case base 360, as well as the configuration of case base 360 depicted in FIG. 10, are consistent with exemplary implementations of the instant invention. It should, therefore, be understood that other information may be maintained in case base 360, and even with the information described, certain data may not be present, additional data may be added, and the arrangement or form of the data may be modified in any fashion.

As FIG. 3 illustrates, case base 360 may be coupled to acquisition module 370. Acquisition module 370 may be configured to retrieve sessions from application 390, as they are completed, prepare the sessions for storage, and log and store sessions in case base 360. Acquisition module 370 may also be configured to eliminate old and/or unusable sessions from case base 360. As illustrated, acquisition module 370 may comprise an application interface 372, a parser 374 and a database interface 376.

Application interface 372 may be any mechanism, program, algorithm, or scheme for linking application 390 with acquisition module 370. Application interface 372 may facilitate data exchange between application 390 and acquisition module 370. In one embodiment, the Extendable Markup Language (XML) may be employed to facilitate the data exchange between application 390 and acquisition module 370. However, a skilled artisan will appreciate that the Standard Generalized Markup Language (SGML) may alternatively be employed. Moreover, any other language that facilitates the creating and sharing of common information formats may be used.

In exemplary embodiments, acquisition module 370 may be configured to retrieve information from application interface 372 and arrange the information in a form corresponding to the data structures used in case base 360. This may be performed, in one implementation, via parser 374. Parser 374 may include any mechanism, program, algorithm, or scheme for separating sequential information into segments that can be managed or used by another component. In one exemplary configuration, parser 374 may be an XML parser.

Database interface 376 may be configured to receive the parsed information from parser 374 and insert the information in case base 360. Thus, database interface 376 may be any mechanism, program, algorithm, or scheme for linking acquisition module 370 with case base 360. In one embodiment, database interface 376 may be a transfer function.

Figure 5:
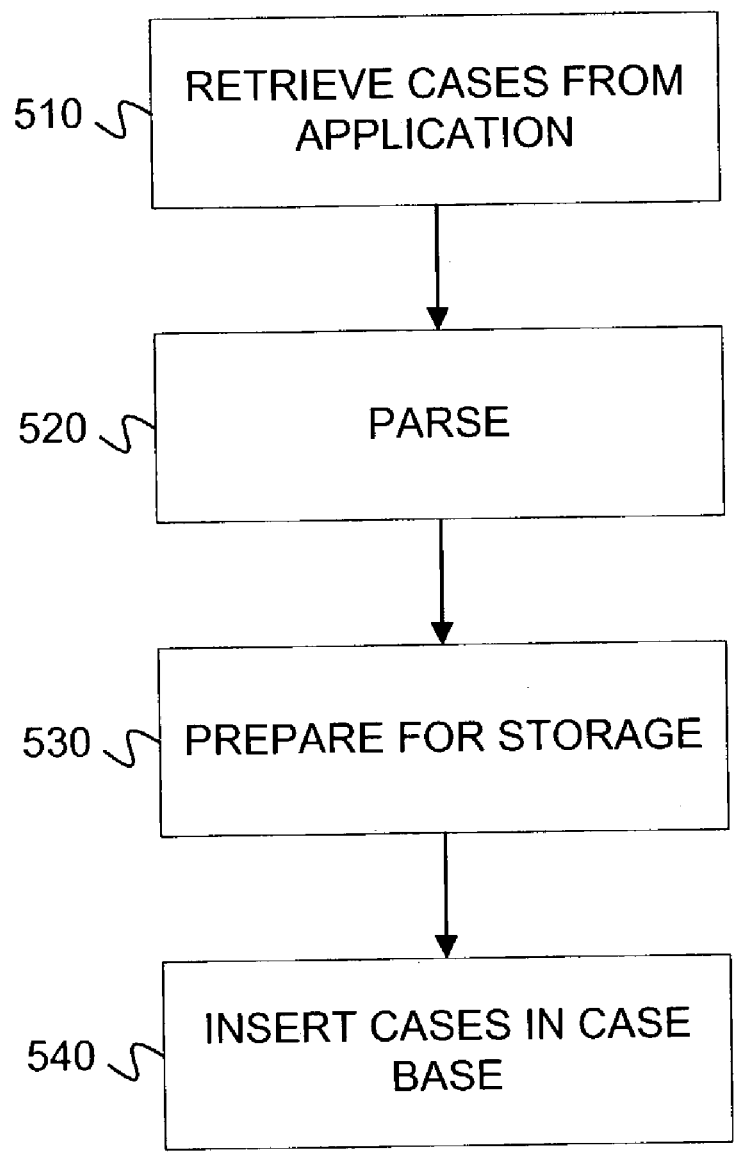
FIG. 5 is a flowchart graphically depicting steps of a method consistent with operation of the present invention.

The operation of acquisition module 370 may, in one embodiment, be consistent with the steps illustrated in the flowchart of FIG. 5. As indicated in step 510, sessions may be retrieved from an application. In exemplary embodiments, a session, upon completion, will be transferred or retrieved from application 390 via application interface 372. In one implementation, a session may be transferred from the application in its entirety. That is, all actions performed in the session are transferred simultaneously. Thus, acquisition module 370 receives or retrieves a sequence, or list, of actions.

Once the sequence of actions (session) is received via the application interface, the session may be parsed into single features, each feature representing a single action (step 520). The parsed session may then undergo further formatting via parser 374 or database interface 376 (step 530), and may be inserted into case base 360 via database interface 376 (step 540).

Figure 6:
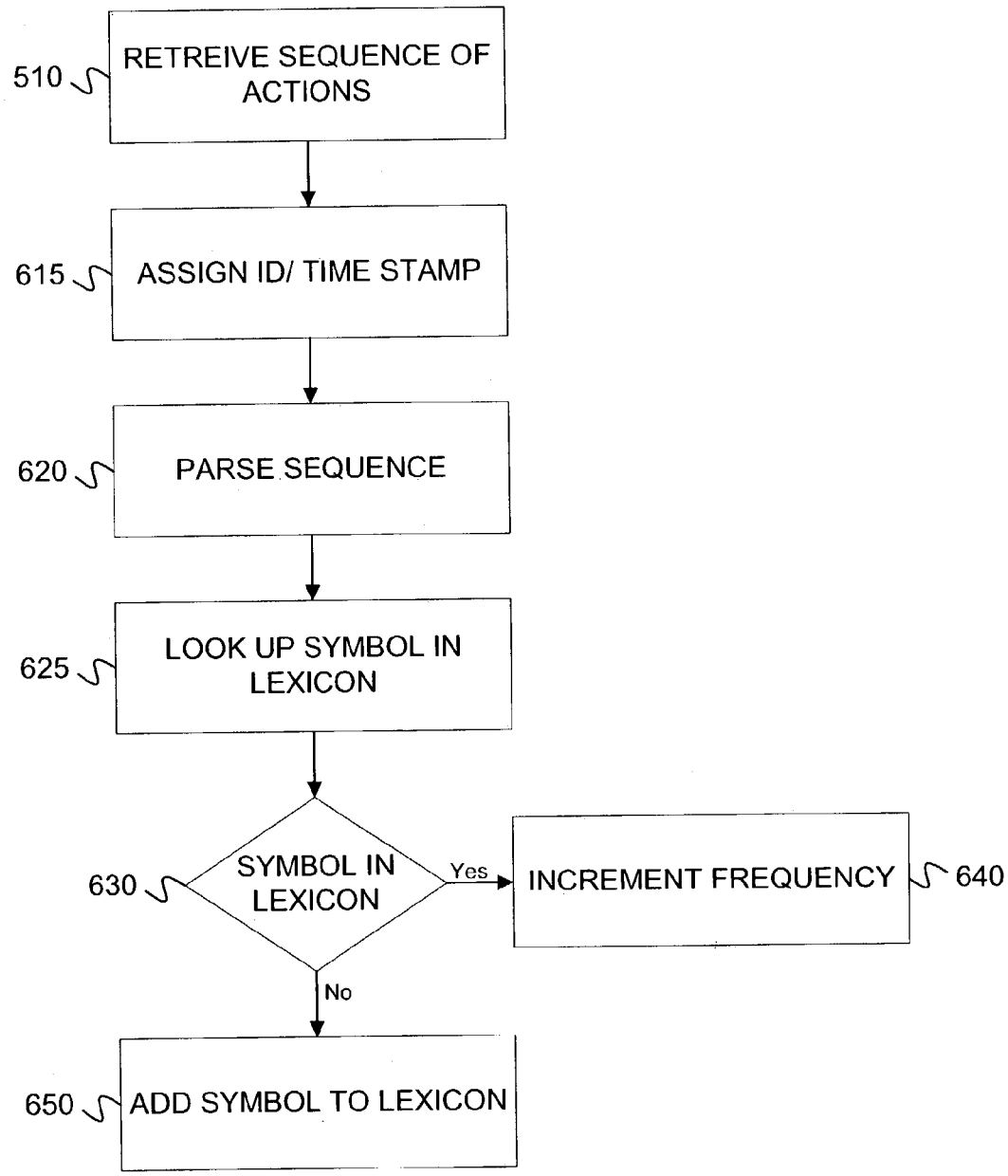
FIG. 6 is another flowchart graphically depicting steps of a method consistent with an exemplary implementation of the present invention.
Figure 7:
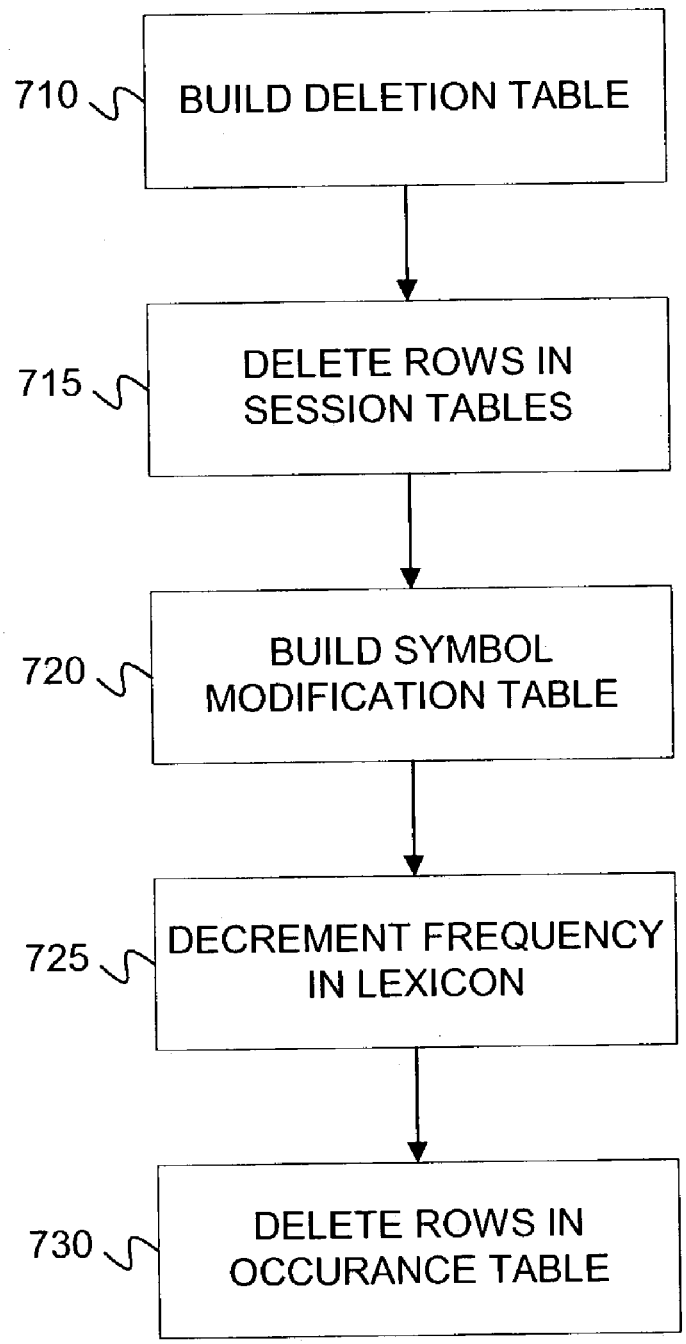
FIG. 7 is another flowchart graphically depicting steps of a method consistent with an exemplary implementation of the present invention.
Figure 8:
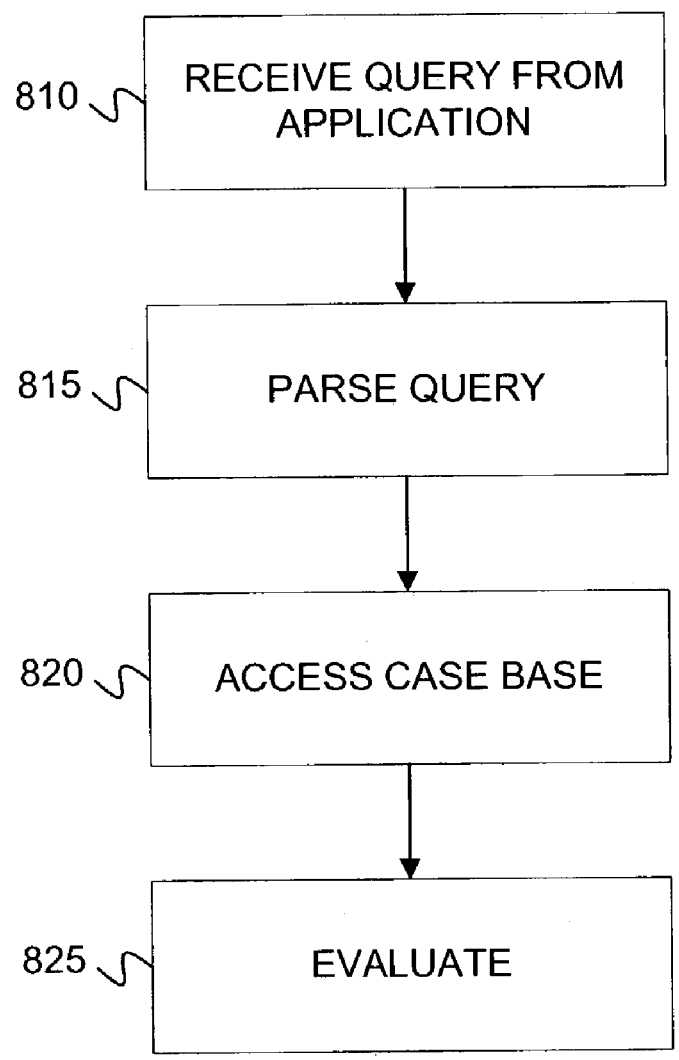
FIG. 8 is another flowchart graphically depicting steps of a method consistent with an exemplary implementation of the present invention.

FIG. 5 illustrates the general operation of acquisition module 370, consistent with one particular configuration, in order to provide initial clarity with regard to the module's functionality. Additional details of the operation and functionality of acquisition module 370 will now be described in connection with FIGS. 6 and 7.

One function of acquisition module may be logging sessions received from an application. In one implementation, logging a given session may be consistent with the steps illustrated in the flowchart of FIG. 6. As indicated by the flowchart, a session may be received or retrieved, as discussed above in connection with step 510. Upon receiving a completed session, the session may be assigned a session identifier (ID) and a time stamp indicating the transfer time (step 615). As explained above in connection with step 520, the session may then be parsed into separate features, each representing a single action. As indicated by step 625, each feature may then be looked up in the lexicon (e.g., the lookup table). In exemplary implementations, each feature in the lookup table may be associated with a value indicating the action's total frequency of occurrence in all cases currently maintained in case base 360. Accordingly, if it is determined (step 630) that a given feature already resides in the lexicon (i.e., was previously inserted from another session), then that feature's total frequency is incremented by one (step 640). This step may involve incrementing a numeric counter residing in one or more tables.

If, however, acquisition module 370 determines (step 630) the given feature is not found in the lexicon, the feature is added to the lexicon (step 650) and its frequency is initialized to one. Step 650 may further involve storing the feature in an occurrence table along with the session identifier and an identifier representing the feature's position within its session. This may be performed via database interface 376. In this fashion, the system vocabulary may dynamically evolve over time to include additional actions.

Another function of acquisition module 370 may be eliminating old or unusable sessions from case base 360, thereby optimizing the quality of sessions in case base 360; keeping the number of sessions in case base 360 to a reasonable quantity; and maintaining the speed at which sessions, and therefore guidance, are retrieved and processed. In exemplary implementations, methods may be provided for eliminating sessions using a time threshold, a capacity threshold, and/or a growth factor. That is, sessions may be deleted once they have been maintained in case base 360 for a specific amount of time or in order to re-allocate storage space in case base 360 for new incoming sessions. Sessions may also be eliminated based on their rate of success. In one exemplary configuration in which tables are employed by case base 360, methods for eliminating sessions may be consistent with the steps illustrated in the flowchart of FIG. 7.

As step 710 indicates, acquisition module 370 may construct a deletion table listing all sessions that meet a deletion criteria. The deletion criteria may include a pre-determined time threshold, capacity threshold, and/or growth factor.

For example, stagnant sessions may be selected for deletion if, for example, such sessions have resided in case base 360 over 90 days without being used for providing guidance. In an exemplary configuration, step 710 may involve looking up time stamps in the session table and transferring the rows of the session table having matching entries into the deletion table.

Upon building the deletion table, acquisition module 370 may then delete rows in the session table that match those in the deletion table, as indicated by step 715. Acquisition module 370 may then build a feature modification table, as illustrated by step 720. Step 720 may involve selecting each row of the occurrence table containing a session identifier witch matches a session identifier in the deletion table and inserting these rows from the occurrence table into the feature modification table.

As indicated by step 725, the total frequency of the features listed in the feature modification table may then be decremented in the lexicon by an appropriate value corresponding to the number of occurrences. Step 725 may involve looping over the feature modification table any number of times. The feature modification table may then be used to delete rows in the occurrence table (step 730). Step 730 may involve deleting rows in the occurrence table that match those listed in the feature modification table.

An additional function of acquisition module 370 may be to install bootstrap corpora. As used herein, the term "bootstrap corpus" refers to a compilation of sessions developed to initiate and/or optimize guidance. In exemplary embodiments, one or more bootstrap corpora may be installed for a given application. In certain implementations, the bootstrap corpora may be used in conjunction with one or more learning parameters maintained in case base 360.

The learning parameters may cause system 30 to operate in a "training" mode. In training mode, sessions that are inserted into case base 360 may be assigned a higher than actual frequency of occurrence, thereby receiving a higher bias than other sessions. In exemplary embodiments, frequency of occurrence may be used as a criteria for selecting a session for guidance. Thus, a bias may be used to ensure that certain sessions (e.g., those in the bootstrap corpora) are selected for guidance. The bias may, in one configuration, be pre-specified and/or updateable via a bias parameter maintained in the case base.

Bootstrap corpus installation ensures that useful guidance may be obtained as soon as a user initiates a request. That is, installing bootstrap corpora may allow the instant invention to instantly, or at least very quickly, adapt to a given application. Thus, a first user of a new application may be able to receive useful guidance, even though no previous sessions by other users have been obtained. In addition, guidance may be optimized at any time, by the installation of bootstrap corpora, to alter or optimize provided guidance. This may be especially useful if guidance is consistently unsuccessful due to faulty user actions or a lack of application use.

Retriever module 380 may be configured to retrieve, from case base 360, one or more sessions that are compatible with a given partial session. As used herein, the term "partial session" refers to one or more actions a guidance-seeking user has performed prior to requesting guidance. Retriever module 380 may be configured to provide guidance to a guidance-seeking user based on retrieved compatible sessions. As FIG. 3 illustrates, retriever module 380 may comprise components similar to those included in acquisition module 370, such as application interface 372, parser 374, and database interface 376. In addition, retriever module 380 may comprise a user interface 385 and an evaluator 387.

In exemplary embodiments, application interface 372 may retrieve or receive a partial session (or query) from a given application. The transfer and/or retrieval of queries may be consistent with the process described above in connection with acquisition module 370.

Upon receiving a query, parser 374 may parse the query as described above in connection with the parsing of completed sessions. Database interface 376 may be configured to select and retrieve information from case base 360 based on a selection criteria. In one embodiment, the selection criteria may be contained in the queries. That is, a given query may be constituted by one or more selection criterion. For example, a particular action symbol (feature) contained in a query may be a selection criteria. Database interface 376 may, in exemplary embodiments, be event-triggered and may be configured to retrieve from case base 360 sessions stored therein matching a given selection criteria (e.g., containing a particular feature).

Evaluator 387 may be configured to generate guidance given a particular partial session. Evaluator 387 may be any mechanism, process, algorithm, or scheme for computing guidance based on a query. In one exemplary implementation, evaluator 387 may employ a backward chaining process for computing guidance, the details of which are discussed below in connection with the flowchart of FIG. 9. Guidance may be presented from evaluator 387 to a user via user interface 385.

User interface 385 may be any mechanism, program, algorithm, or scheme for presenting guidance. In one embodiment, user interface 385 may also facilitate user interaction with one or more components of system 30. User interface 385 may present to the user one or more selectable guidance options which, when selected, instantiate the retrieval of guidance. It should be understood that user interface may reside in retriever module 380, as illustrated, or may additionally or alternatively reside in a given application. It should, therefore, also be understood that user interface 385 may be coupled to, and configured to operate with, one or more other user interfaces contained in application 390. User interface may present guidance to a user via display device, such as monitor 130.

Figure 9:
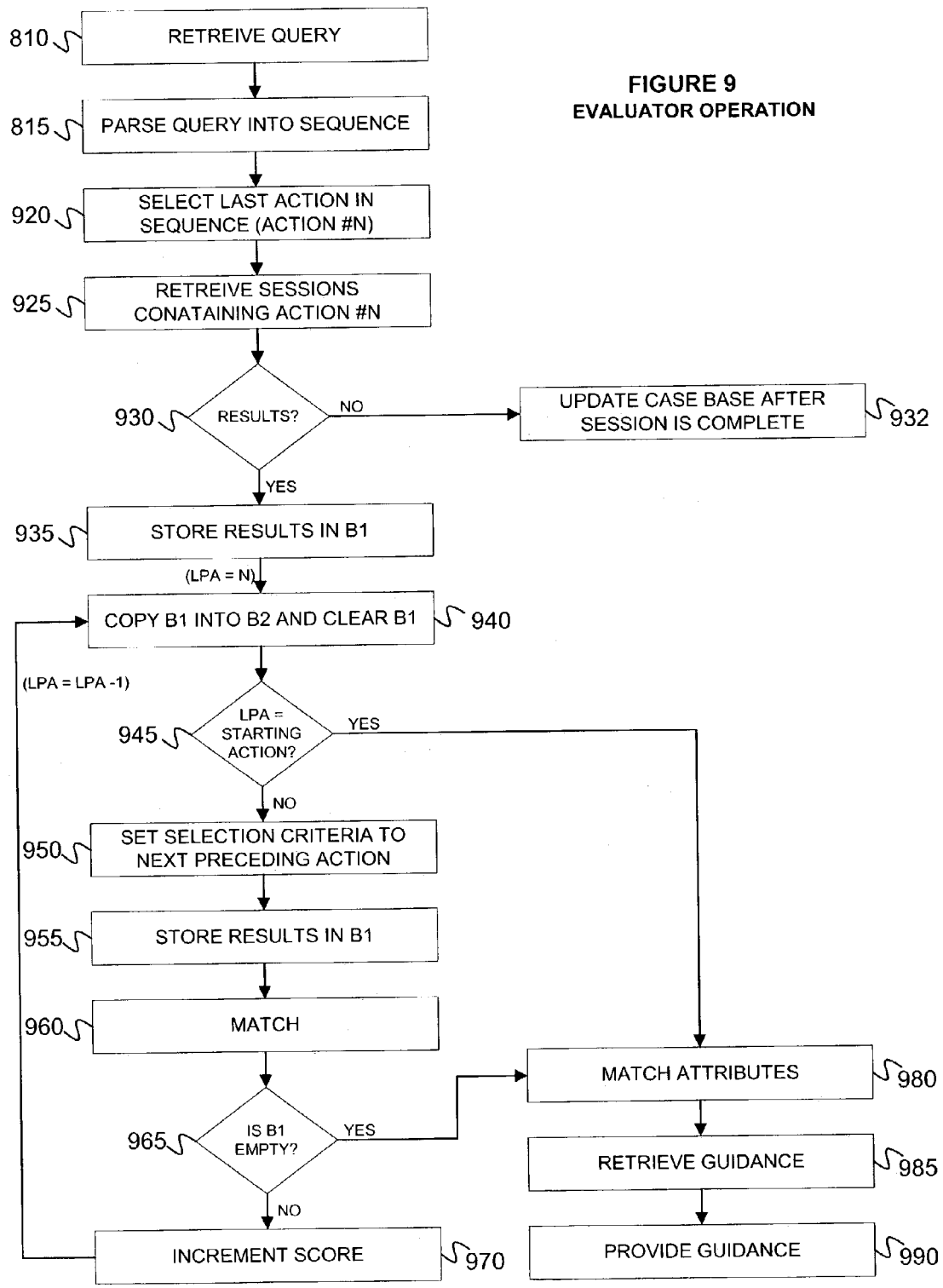
FIG. 9 is another flowchart graphically depicting steps of a method consistent with an exemplary implementation of the present invention.

Referring now to FIG. 9, one exemplary implementation of a backward chaining process consistent with one configuration of the instant invention will be described. As indicated by step 910, a partial session (query) may be retrieved or received from a given application via application interface 372. Upon obtaining the query, parser 374 may parse the actions contained therein into single actions, or selection criterion (step 915).

Given a partial session parsed into a sequence of actions, the last action in the sequence may be set as the selection criterion (step 920). For example, if the partial session contains N actions, action N would be chosen as the selection criteria. The last action (action N) in a partial session is representative of the last action performed by the guidance-seeking user prior to requesting guidance. As step 925 depicts, all sessions containing this selection criteria (i.e., containing an action equivalent to action N) may then be selected and retrieved from case base 360 via database interface 376. In one configuration, this step may involve selecting, for each matching session, the identifiers of the matching sessions and the position(s) in the session where the action equivalent to action N occurred. If there are no matching sessions, a message indicating such may be displayed to the user (step 932). In addition, this step may involve ensuring that the current partial session containing action N is inserted into case base 360 for subsequent queries. In this fashion, new cases may be acquired and the system vocabulary of actions may evolve over time. It should be noted that the bootstrap corpora may be especially useful in preventing such instances where no matching sessions exist.

If case base 360 does, however, contain sessions which match the selection criteria (i.e., contain an action equivalent to action N), associated data (ID's, action positions, etc.) may then be inserted in a buffer B1 (step 935). Buffer B1 may be configured to include a table which is filled with the ID's and of the matching sessions. In addition, buffer B1 may maintain a score parameter, and step 935 may involve setting the score for each of the matching sessions equal to one. At this point, as indicated in FIG. 9, the last processed action (LPA) is equal to action N. That is, if there were twenty-five actions in the partial session, the LPA would be action number twenty-five. As indicated by step 940, the contents of buffer B1 may then be copied into buffer B2 and the contents of buffer B1 may be cleared. Buffer B2 may be of a similar structure as buffer B1 but may additionally include a column for storing referential positions. This column may indicate with which query position the position in the retrieved session corresponds. Buffer B2 may serve as a constraint for subsequent session selections and to maintain further attribute matching.

Assuming for the moment that N>1, the next preceding action in the query (action N−i; i=1) is selected as the selection criteria. For example, if N=25, action number 24 would be selected. As before, the appropriate data associated with sessions containing action (N−i) may be stored in previously cleared buffer B1 (step 955).

At this point (assuming matching sessions were found), a matching algorithm may be performed. In one implementation, matching may include: (1) deleting the rows in buffer B1 containing session ID's that are not present in buffer B2; (2) determining in which matching sessions, contained in the buffers, action (N−i) occurs at a position where it is not a predecessor of the LPA (action 25); and (3) deleting those rows which contain action (N−i), but do not have this action preceding the LPA.

As step 970 indicates, upon performing the matching algorithm, the score for each session having its ID in buffer B1 may then be incremented by one. At this point, the LPA is equal to action 24. As before, the contents of buffer B1 may then be copied into buffer B2 and B1 may be erased (step 940) and the above described process may be repeated for i=1, 2, . . . , N−1. This iterative process may be repeated until (1) the LPA is equal to the first action in the partial session (step 945), i.e., there are no more preceding actions (i=N−1); or (2) no matching sessions are found (step 965). Once either of these instances occur, the remaining sessions in buffer B2 (obtained from case base 360) serve as the basis for providing guidance.

It should be noted that the score may be indicative of how long matching sequences are contained in the session compared to query. The score may increase as the duration of residence increases. A high score may indicate a high level of confidence that the particular session will provide useful guidance.

In certain embodiments, prior to using the retrieved sessions to generate guidance, attribute matching may be performed (step 980). Attribute matching may be used to increment the score of matching sessions having particular attributes. Thus, step 980 may be a preference process and may involve: (1) choosing from buffer B2 a given session ID and position as the selection criteria; (2) retrieving from case base 360 attribute-value information corresponding to the session ID-position pairs and inserting this information into an attribute buffer BA; (3) incrementing the score of a session when the ID in buffer BA matches an ID in buffer B2, the feature in buffer B2 matches a feature in the query, and the attribute in buffer BA matches the attribute of the action in the query at the referential position maintained in buffer B2; (4) deleting the row from buffer BA when (3) is not satisfied. Accordingly, session in which the actions and attributes correspond are scored higher.

After matching attributes, step 980 may include matching the values that correspond to the attributes. In exemplary embodiments, the same process as described in connection with attribute matching could be employed for value matching.

At this point, guidance may be retrieved, as indicated by step 985. This step may include providing a recommended course of action reflecting one or more actions from the sessions forming the basis of guidance that occur after the last action in the query. That is, one or more actions, from previous sessions, occurring after an action contained therein equivalent to the last action performed by a user prior to requesting guidance may be retrieved and used to provide guidance. For example, if a session retrieved for guidance contains m actions (N<m<∞), the guidance may be reflective of at least one of the m actions included in the retrieved session occurring at a position therein which is subsequent to N. Step 985 may involve iteratively retrieving any given number and combination of actions from a session containing m actions occurring after the Nth action therein, i.e., any number and combination of actions N+1, N+2, . . . N+(m-N). It should be understood that any number and combination of sessions may be used from which to retrieve these actions. In exemplary embodiments, a threshold value could be pre-defined in order to limit the number of sessions from which to retrieve guidance. Additionally or alternatively, sessions from which actions are retrieved may be selected via each session's respective score. For example, guidance may be retrieved from the best five sessions (those with the top five scores).

Upon retrieving guidance, that is, upon compiling one or more actions to recommend to a guidance-seeking user, the guidance may be provided to the user. This is graphically depicted by step 990. In exemplary embodiments, providing guidance may be performed via user interface 385. Step 985 may involve presenting, via a display device, a recommended course of action that the user could perform. This step may also involve presenting evidence as to why the provided steps are suggested and one or more probable outcomes resulting from performing the steps. This evidence may be based on the relationship between the partial session (query) and the session(s) used for providing the guidance.

The steps illustrated in the flowcharts of FIGS. 5-9 are consistent with exemplary implementations of the instant invention. It should, therefore, be understood that other method steps may be used, and even with the methods depicted in FIGS. 5-9, the particular order of events may vary without departing from the scope of the present invention. Further, certain steps may not be present, additional steps may be added, and the order of the steps may be modified without departing from the scope and spirit of the invention, as claimed.

Moreover, for clarity of explanation, case base 360, acquisition module 370, and retriever module 380 are described as separate modules, each comprising discrete functional elements. However, it should be understood that the functionality of these modules may overlap and/or may co-exist in a single module. Further, the functional elements within a given module may overlap or exist in a single element.

Additionally, as explained above, it should be understood that the instant invention is not restricted or inherently related to any particular type of application. Moreover, system 30 is not restricted to including a single application (390). In exemplary embodiments, the instant invention may be used in conjunction with a plurality of applications residing in varying locations, as will be explained below in connection with FIG. 4. In addition, the instant invention may be application expandable. That is, the instant invention may be adaptable to new applications as they are developed or installed.

As previously mentioned, system 30 may be implemented in software and may reside in a memory on a server. This particular implementation is depicted by system 40 of FIG. 4. As illustrated, system 40 may comprise server 401 and client 450. Although a single client is illustrated, any number of geographically-dispersed clients may be included in system 40. Likewise, any number of servers may exist within system 40.

Server 401 and client 450 may be interconnected via, or included in, a network 495. Network 495 may be the Internet, a virtual private network, a broadband digital network or any other structure for enabling communication between two or more nodes or locations. Network 495 may include one or more wired and/or wireless connections. Network 495 may employ communication protocols such as Transmission Control and Internet Protocol (TCP/IP), Asynchronous Transfer Mode (ATM), Ethernet, or any other compilation of procedures for controlling communications among network locations. Server 401 and client 450 may be operatively connected to network 495 by communication devices and software known in the art, such as those commonly employed by Internet Service Providers (ISPs) or as part of an Internet gateway. Server 401 and client 450 may also be assigned network identifiers (ID). The ID's may, in one configuration, be encoded as IP addresses. However, the ID's may be any symbol, value, tag, or identifier used for addressing, identifying, relating, or referencing a particular network device.

FIG. 4 illustrates one particular combination of components that could be included in server 401. As illustrated, server 401 may comprise a processor 415; a network interface 420; and a memory 425. In one configuration, one or more of the components residing in server 401 may be scalable in order to accommodate additional services, data, and/or clients.

Server 401 may be connected to network 495 via network interface 420 which may be operatively connected via a wired and/or wireless communications link. Network interface 420 may be any mechanism for sending information to and receiving information from network 495, such as a network card and an Ethernet port, or to any other network such as an attached Ethernet LAN, serial line, etc. Server 401 may additionally comprise a data port for transmitting data serially or in parallel.

In one configuration, server 401 may include processor 415, which may be operatively configured for routing information among components and devices. Processor 415 may also be configured for executing computer instructions received from case base 360, acquisition module 370, retriever module 380, and As FIG. 4 illustrates, case base 360, acquisition module 370, retriever module 380, and application 390 (system 30) may reside in memory 425. Memory 425 may be any mechanism capable of storing information including, but not limited to, RAM, ROM, magnetic and optical storage, organic storage, audio disks, and video disks. Although a single memory is shown, any number of memories may be included in server 401, and each may be configured for performing distinct functions.

For the sake of brevity, FIG. 4 depicts case base 360 as a single database residing in memory 425. However, as explained above, case base 360 may be a distributed database dispersed and/or replicated among one or more servers and/or clients. Case base 360 may alternatively include other storage mechanisms residing in one or more servers and/or clients. In addition, case base 360 may reside external to server 401 and may be coupled to network 495.

It should be understood that all or part of the functionality of case base 360, acquisition module 370, and retriever module 380 may co-exist and/or be distributed among several servers and/or one or more clients. Further, the instant invention may be used in conjunction with a plurality of applications residing in one or more servers and/or clients. Moreover, as previously explained, the instant invention may be application expandable. Thus, the instant invention may be adaptable to new applications as they are developed or installed on the servers or clients.

Accordingly, sessions may be obtained from any number of clients interacting with a given application via network 495. Thus, guidance may be provided to a given user based on the sessions obtained from a plurality of clients and, therefore, users (as illustrated in FIG. 1). However, in alternative configurations, system 30 may reside in client 450 (e.g., a single personal computer) and may provide guidance to users of client 450. Thus, guidance may be provided to a user of a given application based on sessions obtained from user interactions with that application obtained from a single client (450).

In one configuration, client 450 may include components similar to those described in connection with server 401, such as network interface 420 and processor 415. However, user terminal 450 may be structurally different from server 401 and may have varying or additional components. User terminal 401 may be a personal computer, mobile computing device (e.g., a PDA), mobile communications device (e.g., a cell phone), or any other structure that enables a user to remotely access information. In alternative embodiments, user terminal 450 could be a kiosk or "dumb" terminal coupled to server 401. In one exemplary implementation, user terminal 450 may comprise a display device 480, an input device 475, and a memory 465.

As illustrated, user terminal 450 may comprise memory 465, which may be of similar structure to memory device 425 in server 401. However, in certain configurations, memory 465 may have less storage capacity than memory device 425 in order to reduce cost and size. As described above, application 390 may, in one configuration, reside in memory 465.

In addition, client 450 may include display device 480, which may be configured to output text, images, or any other type of information by way of a cathode ray tube, liquid crystal, light-emitting diode, gas plasma, or other type of display mechanism. For example, display device 480 may be a computer monitor such as monitor 130, illustrated in FIG. 1. Display device 480 may be used in conjunction with input device 475 for allowing user interaction.

Input device 475 may include at least one button actuated by the user to input commands and thereby select from a plurality of processor operating modes. Input device 475 may include components such as keyboard 110, a mouse, and/or a touch screen. Input device 475 may additionally or alternatively include a data reading device and/or an input port.

Figure 11:
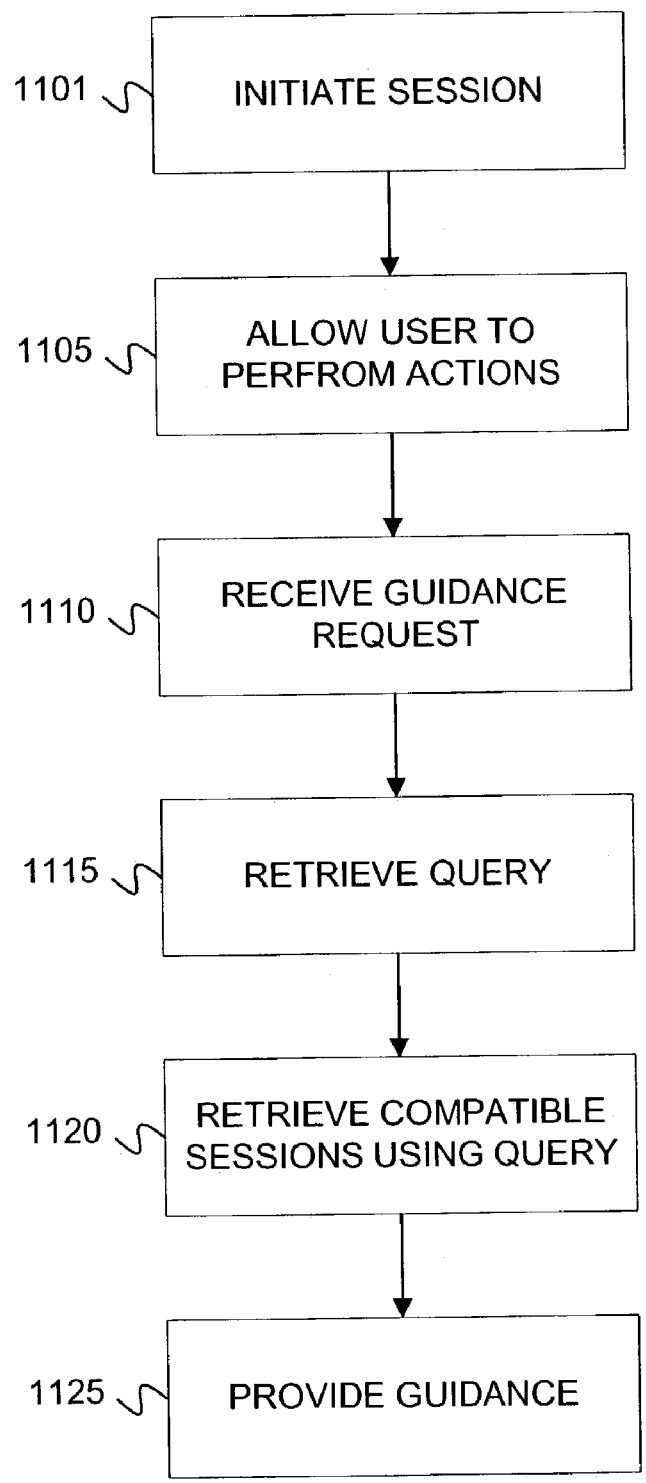
FIG. 11 is a flowchart depicting operation of the present invention in accordance with one exemplary implementation.

In one exemplary implementation, operation of the instant invention may be consistent with the steps illustrated in the flowchart of FIG. 11. It should, however, be understood that other alternative method steps may be employed, and even with the methods depicted in FIG. 11, the particular order of events may vary without departing from the scope of the present invention. Further, certain steps may not be present and additional steps may be added without departing from the scope and spirit of the invention, as claimed.

As step 1101 illustrates, a session may be initiated. This step may involve a user initiating an interaction with, or gaining access to, application 390. For example, a user may login to an e-commerce website, via client 450, by providing a username and password. Upon initiating a session, the user may perform one or more actions, as indicated by step 1105. As explained above, actions could include, for example, menu selections, data entries, and hyperlink As depicted in step 1110, a command or request for guidance may be received from the user. In one implementation, user interface 385 may display via display device 480 one or more guidance options or icons from which a user may select. Upon receiving the request for guidance, retriever module 380 may retrieve a query (step 1115). This may involve obtaining the actions performed by the user (step 1105) prior to requesting guidance (i.e., a partial session) from application 390 via interface 372. This step may also involve parsing the partial session into single actions. The query may then be used to retrieve compatible sessions from case base 360, as indicated in step 1120. Step 1120 may involve accessing case base 360 and retrieving one or more cases containing one or more actions that are equivalent to the actions included in the partial session (query). This step may, in one implementation, involve using a backward chaining strategy (see FIG. 9) to obtain the most compatible sessions from case base 360.

As indicated by step 1125, the session retrieved in step 1120 may be used to provide guidance to the user. Step 1125 may involve providing to the user a recommended course of action based on at least one of the actions included in the compatible sessions. In one implementation, the recommended course of action may include one or more actions performed by previous users. This may involve presenting (via display device 480) from one or more of the compatible sessions at least one action occurring subsequent to an action included therein which is equivalent to the last action performed by the user prior to requesting guidance (step 1110).

It should be understood that processes described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

It will be apparent to those skilled in the art that various modifications and variations can be made in the systems and methods of the present invention as well as in the construction of this invention without departing from the scope of or spirit of the invention.

The present invention has been described in relation to a particular example which is intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed implementation or configuration. Thus, the true scope and spirit of the invention is indicated by the following claims.

What is claimed is:

1. A method for providing guidance to a current user of an interactive application comprising:
   maintaining a plurality of user sessions, each session comprising at least one action performed by at least one of a plurality of previous users of the interactive application;
   receiving at least one action from the current user;
   receiving, from the current user, a command to obtain guidance;
   selecting, in response to the command, at least one of the plurality of user sessions, the selected at least one of the plurality of sessions characterizing activities by the plurality of previous users that occurred subsequent to such users completing an action while using the interactive application that corresponds to the received at least one action from the current user; and
   providing the current user with guidance based on the at least one selected session.

2. The method of claim 1, wherein providing guidance comprises providing a recommended course of action to the current user, the recommended course of action reflecting at least one action included in the at least one selected session occurring subsequent in time to the related action.

3. The method of claim 1, wherein maintaining the plurality of user sessions comprises maintaining said sessions in at least one of a relational database, a distributed database, and an object-oriented programming database.

4. The method of claim 1, wherein maintaining the plurality of user sessions comprises maintaining said sessions in an R/3 database.

5. The method of claim 1, wherein maintaining the plurality of user sessions comprises maintaining a plurality of scores for each of said plurality of sessions.

6. The method of claim 5, wherein the scores reflect each session's contribution to the provided guidance.

7. The method of claim 5, wherein the scores reflect the amount of time that each session has been maintained.

8. The method of claim 5, wherein selecting at least one of the plurality of user sessions comprises selecting at least one of the plurality of sessions based on its score.

9. The method of claim 8, wherein selecting comprises selecting at least one of the plurality of sessions having a predetermined score.

10. The method of claim 1, wherein maintaining comprises eliminating at least one of the plurality of user sessions based on at least one of a pre-determined time limit and a pre-determined storage capacity.

11. The method of claim 5, wherein maintaining comprises eliminating at least one of the plurality of user sessions based on said session's score.

12. The method of claim 1, wherein maintaining the plurality of user sessions includes maintaining at least one session previously performed by the current user.

13. The method of claim 1, wherein the plurality of actions are arranged in a sequence and wherein the sequence is parsed into single actions in order to facilitate the selecting at least one of the plurality of user sessions.

14. The method of claim 1, wherein maintaining the plurality of user sessions includes maintaining at least one of a user input, a keystroke, a mouse actuation, an alphanumeric entry, a menu selection, an e-commerce transaction, an e-mail transmission, a data transfer, and a data receipt.

15. The method of claim 1, wherein selecting at least one of the plurality of user sessions comprises selecting said sessions using a backward chaining process.

16. The method of claim 1, wherein maintaining the plurality of user sessions comprises retrieving said sessions from the application in a first arrangement and rearranging said sessions such that said sessions can be maintained.

17. A method for providing guidance to a current user of an interactive application comprising:
   maintaining a plurality of user sessions, each session comprising at least one action performed by at least one of a plurality of previous users of the interactive application;
   receiving, from the current user, a command to obtain guidance relating to a future action, the command specifying at least one action taken by the current user;
   selecting, in response to the command, at least one of the plurality of user sessions, the selected at least one of the plurality of sessions characterizing activities by the plurality of previous users that occurred subsequent to such users completing an action while using the interactive application that corresponds to the at least one action specified by the command; and
   providing the current user with guidance based on the at least one selected session.

18. A system for providing guidance comprising:
   a storage mechanism for maintaining a plurality of user sessions, each session comprising a plurality of actions performed by at least one of a plurality of users of an interactive application;

an acquisition module for retrieving each of the plurality of user sessions from the interactive application and storing each session in the storage mechanism;

a retriever module for:
retrieving at least one action from a current user of the interactive application;
selecting, in response to a command received from the current user, at least one of the plurality of sessions from the storage mechanism, the selected at least one of the plurality of sessions characterizing activities by the plurality of previous users that occurred subsequent to such users completing an action while using the interactive application that corresponds to the retrieved at least one action from the current user; and
generating guidance based on the at least one selected session; and a user interface for presenting the guidance to the current user.

19. The system of claim 18, wherein retriever module provides guidance by way of providing a recommended course of action to the current user, the recommended course of action reflecting at least one of the plurality of actions included in the at least one selected session occurring subsequent in time to the related action.

20. The system of claim 18, wherein the storage mechanism is at least one of a relational database, a distributed database, and an object-oriented programming database.

21. The system of claim 18, wherein the plurality of actions are arranged in a sequence, and wherein the sequence is parsed into discrete actions thereby allowing the retriever module to select at least one of the plurality of sessions.

22. The system of claim 18, wherein the acquisition module retrieves each of the plurality of user sessions from the interactive application in a first arrangement and rearranges said sessions in order to store said sessions in the storage mechanism.

23. The system of claim 22, wherein the first arrangement is a sequence and wherein the retriever module parses the sequence in order to store the sessions in the storage mechanism.

24. The system of claim 18, wherein each of the plurality of actions includes at least one of a user input, a keystroke, a mouse actuation, an alphanumeric entry, a menu selection, an e-commerce transaction, an e-mail transmission, a data transfer, and a data receipt.

25. The system of claim 18, wherein the acquisition module and the retriever module are software programs.

26. The system of claim 18, wherein the acquisition module retrieves each of the plurality of user sessions from the interactive application and stores said sessions in the storage mechanism via an Extended Markup Language (XML) program.

27. A system for providing guidance comprising:
an application for use by a current user;
a client, coupled to a network, for allowing the current user to access the application;
a storage mechanism, coupled to the network, for maintaining a plurality of user sessions, each of said sessions comprising a plurality of actions performed by at least one of a plurality of previous users of the application;
a server, coupled to the network, the server having a memory, the memory comprising:
an acquisition module for retrieving each of the plurality of user sessions from the application and storing each session in the storage mechanism;
a retriever module for:
retrieving at least one action from the current user of the application;
selecting, in response to a command received from the current user, at least one of the plurality of sessions from the storage mechanism, the selected at least one of the plurality of sessions characterizing activities by the plurality of previous users that occurred subsequent to such users completing an action while using the application that corresponds to the retrieved at least one action from the current user; and
generating guidance based on the at least one selected session; and
a user interface for presenting the guidance to the current user.

28. The system of claim 27, wherein the retriever module generates guidance by way of providing recommended actions to the current user, wherein the recommended actions reflect at least one of the plurality of actions included in the at least one selected session occurring subsequent in time to the related action.

29. The system of claim 27, wherein the application is located in the memory of the server.

30. The system of claim 27, wherein the application is located in a memory residing in the client.

31. The system of claim 27, wherein the application is an interactive website.

32. The system of claim 27, wherein the storage mechanism is at least one of a relational database, a distributed database, and an object-oriented programming database.

33. A system for providing guidance comprising:
a storage mechanism for maintaining a plurality of user sessions, each session comprising a plurality of actions previously performed by at least one of a plurality of users of an interactive application;
an acquisition module for retrieving each of the plurality of user sessions from the interactive application and storing each session in the storage mechanism;
a retriever module for:
selecting, in response to a command received from the current user, at least one of the plurality of sessions from the storage mechanism, the selected at least one of the plurality of sessions characterizing activities by the plurality of users that occurred subsequent to such users completing an action while using the application that corresponds to at least one action specified by the command; and
generating guidance based on the selected at least one of the plurality of sessions; and
a user interface for presenting the guidance to the current user.

34. A computer-readable medium containing instructions for controlling a computer system to perform a method, the computer system having a current user, a display device, and a processor for executing the instructions the method comprising:
retrieving a plurality of sessions, each of said sessions including a plurality of actions performed by at least one of a plurality of previous users of an application coupled to the computer system;
storing each of the plurality of sessions in a storage device coupled to the computer system;
retrieving a query from the application, said query reflecting at least one action performed by the current user;

receiving, from the current user, a command to obtain guidance;

selecting, in response to the command, at least one of the plurality of sessions from the storage device based on the query, the selected at least one of the plurality of sessions characterizing activities by the plurality of previous users that occurred subsequent to such users completing an action while using the application that corresponds to the at least one action reflected by said query; and providing the current user with the guidance based on the at least one selected session, the guidance reflecting at least one of the plurality of actions included therein.

* * * * *